United States Patent Office 3,811,991
Patented May 21, 1974

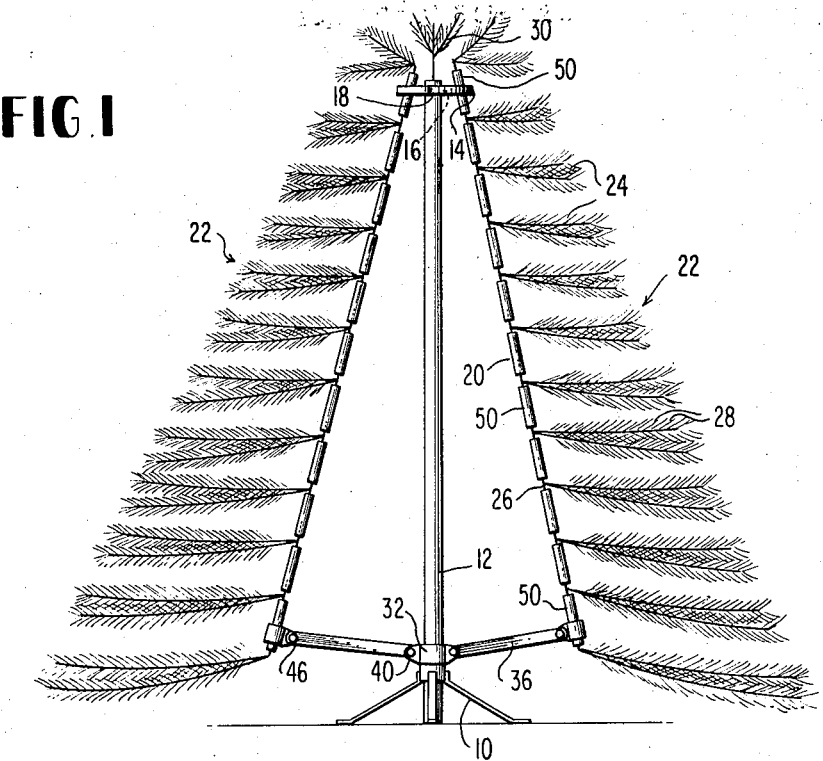
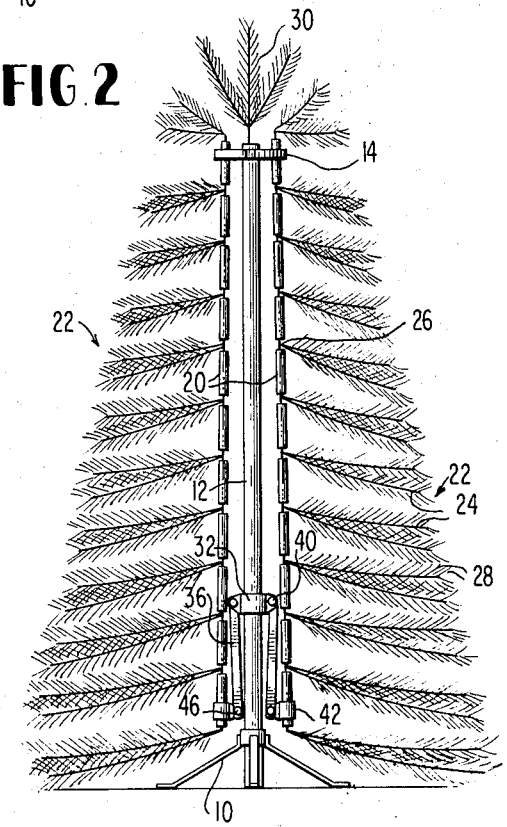
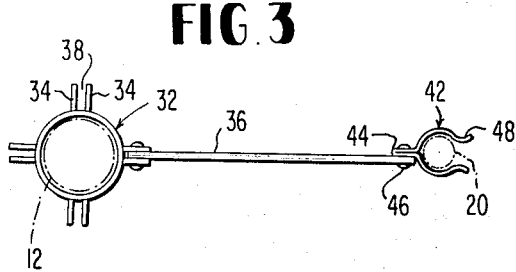
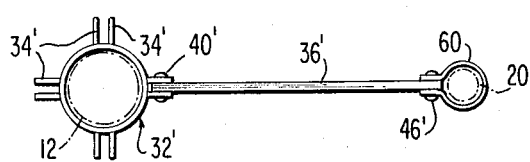
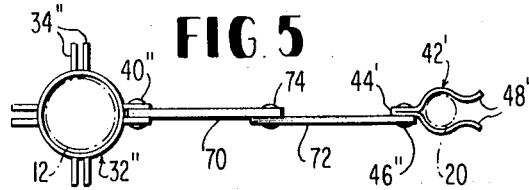

3,811,991
COLLAPSIBLE ARTIFICIAL SHRUB
Percy Dieffenbach, Blakely, Pa., assignor to
Masterpiece, Inc., Blakely, Pa.
Filed Mar. 8, 1973, Ser. No. 339,468
Int. Cl. A47g 33/06
U.S. Cl. 161—24      8 Claims

ABSTRACT OF THE DISCLOSURE

A vertically extending rod-like trunk member carries a plurality of limb assemblies in a circumferential array with each limb assembly including a straight main limb and a number of cross limbs extending outwardly therefrom at spaced longitudinal positions. The upper end of each main limb is coupled to the tree. At some distance below this coupling point for each limb assembly, an axially shiftable collar pivotably supports a radial array of arms which, in turn are pivotably coupled to the main limb of each limb assembly. Shifting of the axially shiftable member causes the main limbs to move from a substantially parallel inboard position relative to the rod-like trunk member to an outboard position in which the main limbs incline downwardly and outwardly to complete a shrub of conical configuration.

BACKGROUND OF THE INVENTION

Field of the invention

This invention relates to the manufacture of artificial shrubs and more particularly to an artificial shrub construction which may be collapsed for storage.

Description of the prior art

One conventional form of artificial shrub or tree employs a relatively small diameter rod normally formed of wood which acts as a vertically extending tree or shrub trunk member with the rod being provided with a series of radial holes which are diagonally drilled at an angle to the axis of the rod and extend upwardly to receive the inner ends of respective limb assemblies formed of twisted wires with captured plastic filaments therebetween. The limb assemblies are each preferably formed of one central or main limb and at least one cross limb, both formed of twisted wires which hold a great number of filaments at right angles to the axis of the twisted wire in the manner of a conventional brush. The limbs and filaments are colored to represent a natural coniferous shrub or tree, preferably green or blue-green, with the outer ends of the main limb and cross limbs having their filament tapered to simulate a natural tree whose tip needles are much shorter than those inwardly thereof. The outer ends of the cross limbs and the outer end of the main limb for each assembly are bent upwardly, while the inner terminal end of the main limb is preferably bent downwardly and at a slight angle to insure that once positioned within radially inclined holes in the rod acting as a tree trunk, any imbalance because of the presence of the cross limbs will not permit rotation of the main limb about its axis due to the presence of the bent portion between the terminal portion, which is inserted within the diagonal hole of the trunk receiving the same and the point where the cross limb is coupled to the main limb and is normally wrapped thereabout.

A second type of tree or shrub construction involves a similar rod-like trunk member supporting a plurality of limb assemblies in the form of a main limb carrying at spaced longitudinal positions cross limbs which extend outwardly therefrom and to one side to form a frusto-conical sector and which may be coupled to the rod or trunk by having the upper end of the main limb hooked and with the main limb forming a rather rigid element permitting the main limb for each limb assembly to extend downwardly and outwardly cantilever supported to the upper end of the trunk member. This second type of structure permits the artificial shrub or tree to be set up and taken down in a very short time and presents a highly stable assembly permitting indoor or outdoor use.

A modified form of the second type of shrub construction normally employs a pair of discs coupled to the rod or trunk, the upper one generally being of relatively small diameter and the lower one being of larger diameter with the periphery of the discs (or their equivalents) being provided with notches at circumferentially spaced positions, such that the main limb of each limb assembly is simply snapped into place on the discs, the small disc normally receiving the upper end of the main limb of each limb assembly and the larger disc being coupled thereto intermediate its ends and having the main limb snap fitted thereto. To change the bushiness and the configuration of the conically produced shrub or tree, one of the discs is axially shifted relative to the other.

It is to this type of second shrub or tree construction that the present invention is directed.

SUMMARY OF THE INVENTION

The present invention is directed to an improved artificial shrub which may be assembled at the factory and which does not require the placement of limb assemblies by the customer onto the tree trunk and wherein the shrub or tree may be collapsed for shipment and expanded during set up.

Specifically, the artificial shrub comprises a vertically extending trunk member and supports in a circumferential array a plurality of limb assemblies including a straight main limb and cross limbs extending outwardly therefrom at longitudinally spaced positions. First coupling means couple the upper ends of each main limb of each assembly to the trunk members, second coupling means downwardly of the first coupling means also couple each main limb to the trunk member. The second coupling means includes means for shifting the main limb from an inboard position in substantial alignment with the axis of the trunk to a downwardly and outwardly inclined position to create a set up shrub of generally conical configuration.

The first coupling means may comprise a snap ring in the form of a disc fixed to the top of the trunk member having a series of circumferentially spaced notches on the periphery corresponding to the number of limb assemblies, said notches receiving the upper end of the main limb of each limb assembly. The second coupling means may comprise a collar axially slidable on the vertically extending trunk member, and pivot arms corresponding to the notches and the limb assembly pivotably coupled at their inner ends to the collar and having their outer ends coupled to the main limbs of respective limb assemblies. Each arm may include a U-shaped spring clip pivotably coupled to the outer end of the arm and adapted to frictionally receive the main limb or an O-ring having an internal diameter approximating that of the main limb which receives the end of the main limb. The ring in another embodiment may be fixed to the trunk member and paired pivotably coupled arms at each main limb location may be employed.

BRIEF DESCRIPTION OF THE DRAWINGS

FIG. 1 is a schematic elevational view of a shrub in expanded condition, in partial assembly, illustrating the method of attaching the individual limb assemblies to the vertically extending tree trunk.

FIG. 2 is a schematic, elevational view similar to that of FIG. 1, with the shrub in collapsed condition.

FIG. 3 is a plan view of a sliding collar assembly forming a portion of the shrub of FIGS. 1 and 2.

FIG. 4 is a similar plan view to that of FIG. 3 of a portion of the sliding collar assembly with a modified arrangement for coupling each of the pivot arms to the lower end of a corresponding main limb.

FIG. 5 is a plan view of a collar assembly of an alternate form of the invention.

DESCRIPTION OF PREFERRED EMBODIMENTS

Referring to the drawings, the artificial shrub of the present invention takes the form of a coniferous tree. In this respect, the artificial shrub consists of a stand 10 of conventional construction, a rod-like trunk member 12 extending upwardly therefrom and supported thereby, which may take the form of a hollow metal tube of a diameter between one-half inch and several inches and a length of, for instance, two feet or more or maybe in the form of a solid wood rod or of tubular plastic. Preferably, an upper disc or snap ring 14 is coaxially carried by the trunk member 12 and is preferably provided with an inner serrated peripheral surface so that it may be pressed onto the trunk member 12 so as to be frictionally gripped thereby. At spaced circumferential positions about its outer periphery 16, the disc 14 may be provided with notches or grooves 18 running parallel to its axis which are of a diameter generally on the order of a spacer tube 50 of the main limb 20 of each limb assembly 22. In this respect, a plurality of limb assemblies 26 each consist of a main limb 20 and a plurality of cross limbs or side branches 24. Each main limb 20 may be formed of intertwisted stiffly flexible wire rods 26 and the cross limbs 24 may be formed of intertwisted wires with the flexible wire rods intertwisted to capture the cross limbs and the cross limb wires 34 being intertwisted to capture plastic filaments 28. It is conventional to create the cross limbs of "brush stock," which material is commonly employed in the creation of artificial scotch pine Christmas trees.

In addition, the rod-like trunk member 12 which may be formed of wood, has an axial hole drilled into its upper end and receives a tree top 30 constructed in general in the same manner as the cross limbs 24 to complement the circumferential array of limb assemblies 22.

The present invention is directed to an arrangement which permits the collapsing of the shrub for storage or shipment and the expanding of the same prior to use, thereby changing the position of the main limb of each limb assembly relative to trunk member 12 from an outwardly and downwardly inclined position as shown in FIG. 1, to a generally parallel position as illustrated in FIG. 2. In this respect, the rod-like trunk member 12 slidably supports a cylindrical collar 32 formed of metal or the like and having an internal diameter somewhat greater than the diameter of the rod-like trunk member 12 upon which it is concentrically carried. Collar 32 carries brackets 34 at circumferentially spaced positions which project radially outward and have pivot arms 36 pivotably coupled thereto. The inner end of each arm 36 being received within slot 38 formed by the dual fingers of each bracket 34 with a traversely extending pin 40 passing through the inner end of arm 36 and aligned holes within the bracket fingers. The heads of pin 40 on each side, may be peened to prevent withdrawal of the pin after each arm 36 is assembled to its respective bracket 34. The outer end of each arm 36 carries a main limb coupling member. In the case of FIGS. 1–3, the main limb coupling member consists of a spring metal clip 42 of U-shaped configuration formed of metal strip material, and its base 44 is pivotally coupled to the outer end of arm 36 by a pin 46 in similar fashion to the manner in which pin 40 couples the inner end of each arm 36 to collar 32. The spring fingers 48 of the clip 42 terminates in reversely curved portions in which the gap therebetween is slightly less than the diameter of spacer tube 50 of the main limb 20' of limb assembly 22 received thereby, such that the main limb 20 as illustrated in broken line fashion in FIG. 3, is merely snapped into place.

By reference to FIG. 2, it is seen that in collapsing the tree, or shrub of FIG. 1, collar 32 is slid upwardly on the rod-like trunk member 12 permitting the arms 36 to pivot about both pins 40 and 46, thus causing the main limb 20 of each limb assembly to move into a generally parallel position with respect to the axis of the rod-like trunk member 12 and permitting the shrub to be stored in that fashion as mounted on stand 10 or, alternatively, inserted within a box (not shown). In this case, the stand 10 may be remvoed from the bottom of the rod-like trunk member 12 and dismantled as desired, to facilitate storage.

It is to be noted in the illustrated embodiments, each limb assembly 22 is manufactured such that the cross limbs are advantageously spaced relative to the longitudinal axis of the limb assembly by means of plastic spacer tubes 50 which are inserted on the wire rods forming the main limb 20 of the limb assembly 22 prior to intertwisting the wire rods to capture the cross limbs 24 at longitudinal positions determined by the axial length of the plastic spacer tubes 50. In this respect, the dimensions of clamp 42 are such as to grasp resiliently one of the spacer tubes 50, for instance, the lowermost tube 50 in the illustrated embodiment, although of course depending upon the desired configuration of the tree, collar 32 may be shifted axially of the tree trunk and the clip 42 may grasp one of the spacer tubes 50 intermediate the ends of the limb assembly without changing the manner in which the tree collapses and expands. Disc 14, as noted previously, carries notches 18 on the periphery 16 of a diameter generally conforming to the diameter of the uppermost spacer tube 50 of each limb assembly. Since the tubes 50 are formed of plastic or rubber, this facilitates the frictional locking of the upper ends of each limb assembly onto the disc 14 which acts as the first means for coupling the limb assemblies to the trunk.

Referring next to FIG. 4, an alternate embodiment of the invention employs a similar collar 32' formed of metal and bearing brackets 34 extending radially outward from the periphery of the same at circumferentially spaced positions equal to the number of limb assemblies to be employed in the construction of the shrub or tree. Pivot arms 36' are pinned at their inner ends to brackets 34' by pins 40' in similar manner to the embodiment of FIGS. 1–3 inclusive. This embodiment differs in the manner in which the main limb 20 of the limb assembly is coupled to the outer end of the pivot arm 36'. Instead of having an open sided U-shaped clip, a closed ring 60 formed of metal strip material is pivotably coupled to the outer end of each arm 36' by means of pin 46 and in this case, the bottom of the limb assembly 22 is merely inserted into the opening defined by ring 60 which is of a diameter on the order of the diameter of spacer tube 50. Preferably, the internal diameter or ring 60 is such that a slight force fit is achieved between the spacer tube 50 of each limb assembly and the ring 60 which holds the same. Pivot pins 40' and 46' in the embodiment of FIG. 4 act in like manner to the embodiment of FIG. 3 to permit the ring, in this case, 60 to lie in axial alignment with the main limb 20 of the limb assembly that it supports, regardless of whether the main limb is inclined or parallel with respect to the rod-like trunk member 12.

A further embodiment of the present invention is illustrated in FIG. 5, wherein collar 32" is again formed of a metal strip, but in this case has an internal diameter slightly less than the outer diameter or rod 12 so as to effect a force fit therebetween. Alternatively, the collar may include a screw member passing through the same for locking the collar 32" to the rod-like trunk member 12 at any desired axial position, since during collapsing of the tree, or shrub, or extending the limb assembly to an inclined position relative to the trunk member, collar 32" does not shift axially with respect to the trunk supporting the same. Instead, the bracket fingers 34' pivotably support by means of pivot pins 40' an inner pivot arm 70 which in turn is pivoted by means of pin 74 to an outer pivot arm 72 of comparative length and, in turn, the outer end of outer arm 72 pivotably supports a spring metal clip 42' identical in all other respects to the embodiment of FIG. 3. Pin 46" pivotably couples the base 44' of clip 42' to the outer end of arm 72, while the reversely bent fingers 48' of clip 42' permit the snap fitting of the clip to an appropriate spacer tube 50 of the main limb 20 of the limb assembly associated therewith. FIG. 5 illustrates this portion of the shrub with the shrub in expanded or set up position and with the main limb 20 inclined relative to the rod-like trunk member 12 supporting the same. When collapsed, arms 70 and 72 move into parallel position with their pivot pin 74 connecting the same moving upwardly or downwardly as desired to cause clip 42' to move radially inward, toward collar 32'.

In the illustrated embodiments, the means for coupling the upper ends of each limb assembly and, in particular, the top spacer 50 associated with the main limb 20 consists of a small diameter disc fixed concentrically to the upper end of the rod-like trunk member 12 and with the spacer tubes 50 snapped into notches at spaced circumferential positions on the periphery 16 of disc 14 corresponding to the positions of arms 36 which fan out from the slidable collar 32, for instance, in the illustrated embodiment of FIGS. 1–3. Alternate means may be employed for coupling the upper ends of the limb assemblies 22 to the rod-like trunk member 12. For instance, each limb assembly may terminate at its upper end in hooks which, in turn, are received by axial holes within disc member 14 or within circumferentially spaced holes within disc 14 or its equivalent, or if the trunk member 12 constitutes a metal tube, small diameter tubes may be welded to the top of trunk member 12 in a circumferential array in numbers corresponding to the members of the pivot arms 36 and the hooked ends of each main limb may be carried respectively therein to permit limb assemblies 22 to be supported thereby.

What is claimed is:
1. An artificial shrub comprising:
   a vertically extending trunk member,
   a plurality of limbs including a straight main limb and cross limbs extending outwardly therefrom at longitudinally spaced positions,
   first coupling means for coupling the upper ends of each limb assembly to said trunk at circumferentially spaced positions to form a circular array surrounding said trunk member, and
   second coupling means coupling each limb assembly to said trunk member below said first coupling means, said second coupling means including means for selectively radially shifting the lower end of each limb assembly from a first inboard position with the main limb lying generally parallel to said trunk member to a radially outboard position with the main limb inclined downwardly and outwardly therefrom, and vice versa.
2. The artificial shrub as claimed in claim 1, wherein said second coupling means comprises a collar concentrically positioned on said trunk member and movable axially thereon, and pivot arms pivotably coupled to said collar at spaced circumferential positions corresponding to said limb assemblies and means coupling the outer ends of said arms respectively to said limb assemblies; whereby, axially shifting of said collar effects said radial shifting of said limb assemblies.
3. The artificial shrub as claimed in claim 2, wherein each arm includes a U-shaped spring clip at its outer end frictionally gripping the main limb of said respective limb assembly.
4. The artificial shrub as claimed in claim 3, wherein said clip is pivotally coupled to said arm for rotation about a pivot axis at right angles to the axis of said arm, permitting said clip axis to conform to said main limb axis during movement of said main limb from a position generally parallel to said trunk member to an inclined position therewith.
5. The artificial shrub as claimed in claim 2, wherein said means for coupling the outer end of each pivot arm to a respective limb assembly comprises a ring member pivotally mounted on said arm for pivoting about an axis at right angles to the axis of the arm, said ring having an internal diameter on the order of the main limb received thereby.
6. The artificial shrub as claimed in claim 1, wherein said second coupling means comprises, for each limb assembly, paired pivot arms pivotably coupled to themselves and to said trunk member and said respective limb assembly respectively.
7. The artificial shrub as claimed in claim 6, wherein said coupling means includes a ring concentrically mounted on said trunk member and fixed with respect thereto, brackets fixed to said ring and extending outwardly therefrom at circumferentially spaced positions corresponding in number and position to said limb assemblies with the inner end of said inner pivot arms being pivotably coupled to said brackets.
8. The artificial shrub as claimed in claim 7, wherein said means for coupling the outer end of said outer pivot arm for each limb assembly comprises a U-shaped spring clip pivotably coupled to the outer end of said outer arm being snap fitted to the main limb of said respective limb assembly.

References Cited
UNITED STATES PATENTS

| | | | |
|---|---|---|---|
| 1,590,220 | 6/1926 | Wurts | 161—24 |
| 1,654,427 | 12/1927 | Modlarz | 161—24 |
| 1,694,974 | 12/1928 | Glover | 161—24 |
| 3,030,720 | 4/1962 | Osswald, et al. | 161—24 |
| 3,064,379 | 11/1962 | Hertzberg | 161—24 |
| 3,594,260 | 7/1971 | Dieffenbach | 161—24 |
| 3,692,617 | 9/1972 | Marks et al. | 161—24 |
| 3,746,601 | 7/1973 | Strong | 161—24 |

WILLIAM E. SCHULZ, Primary Examiner

U.S. Cl. X.R.

161—22